US011782900B2

(12) United States Patent
Pundir et al.

(10) Patent No.: US 11,782,900 B2
(45) Date of Patent: Oct. 10, 2023

(54) HIGH THROUGHPUT ORDER FULLFILLMENT DATABASE SYSTEM

(71) Applicant: Walmart Apollo, LLC, Bentonville, AR (US)

(72) Inventors: Amit Kumar Pundir, Bengaluru (IN); Nitesh Jain, Bengaluru (IN); Dev Kumar, Bengaluru (IN); Amit Yadav, Bengaluru (IN); Abhishek Kumar Maurya, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 437 days.

(21) Appl. No.: 15/987,227

(22) Filed: May 23, 2018

(65) Prior Publication Data

US 2019/0311054 A1    Oct. 10, 2019

(30) Foreign Application Priority Data

Apr. 10, 2018 (IN) .............................. 201841013612

(51) Int. Cl.
  *G06F 16/23* (2019.01)
  *G06F 16/27* (2019.01)
(52) U.S. Cl.
  CPC ........ *G06F 16/2365* (2019.01); *G06F 16/273* (2019.01)
(58) Field of Classification Search
  CPC ............. G06F 16/2365; G06F 16/2372; G06F 16/2379; G06F 16/258; G06F 16/27;
  (Continued)

(56) References Cited

U.S. PATENT DOCUMENTS

2007/0078696 A1    4/2007  Hardin, Jr.
2007/0112647 A1*   5/2007  Borders ............. G06Q 30/0601
                                                        705/7.35
(Continued)

FOREIGN PATENT DOCUMENTS

GB         2281644 A  *  3/1995  .......... G06F 11/1471

OTHER PUBLICATIONS

Unknown, "Tap into SAP's In-Memory Database for Rapid Innovation and Digital Transformation", SAP, capture Mar. 22, 2018, pp. 1-14.

(Continued)

*Primary Examiner* — Vaishali Shah
*Assistant Examiner* — Berhanu Mitiku
(74) *Attorney, Agent, or Firm* — Barta, Jones & Foley, PLLC

(57) ABSTRACT

The system and method described herein provide an order fulfillment database system. The order fulfillment database system may provide a high throughput speed, high availability, redundancy, and scalability. The order fulfillment database system supports very fast transaction times for atomicity, consistency, isolation, and durability (ACID) transactions. Order services instances at a primary cluster provide in-memory databases that service segments of the persistent database and are associated with different order fulfillment entities. A routing manager routes database messages to the appropriate order services instance. A secondary cluster of order services instances provides redundancy. A retry procedure preserves the integrity of the database transactions based on a current operational state of the primary order services instances.

20 Claims, 7 Drawing Sheets

(58) Field of Classification Search
CPC .............. G06F 16/273; G06F 16/5866; G06F 16/9017; G06F 16/951; G06F 16/9537; G06F 16/9554; G06F 16/958; G06Q 30/00; G06Q 10/087
See application file for complete search history.

(56) References Cited

U.S. PATENT DOCUMENTS

| | | | | |
|---|---|---|---|---|
| 2009/0037498 | A1* | 2/2009 | Mukherjee | G06F 9/5016 |
| 2010/0070331 | A1* | 3/2010 | Koegler | G06Q 10/0875 705/28 |
| 2010/0070946 | A1 | 3/2010 | Herrmann et al. | |
| 2012/0023369 | A1* | 1/2012 | Bourbonnais | G06F 9/466 714/16 |
| 2014/0012856 | A1* | 1/2014 | Abdelrahman | G06Q 30/0635 707/740 |
| 2017/0124511 | A1* | 5/2017 | Mueller | H04W 4/029 |
| 2017/0287086 | A1 | 10/2017 | Lopez et al. | |

OTHER PUBLICATIONS

Unknown, "The Shortcut to E-Commerce for SAP Business One for SAP Hana", https://www.sana-commerce.com/products/e-commerce-for-sap-business-one-hana/, captured Mar. 22, 2018, 7 pages.

Unknown, "Dive Into The Architecture Behind NuoDB", Database Architecture: Durable Distributed Cache / NuoDB, https://www.nuodb.com/product/durable-distributed-cache, captured Mar. 22, 2018, 4 pages.

Michael Waclawiczek, "Drop Shipping App Vendor Adopts NuoDB for Scalable Saas Deployment", NuoDB, https://www.nuodb.com/blog/drop-shipping-app-vendor-adopts-nuodb-scalable-saas-deployment, Jan. 28, 2014, 2 pages.

Unknown, "Why VoltDB?", Translytical Database/VoltDB, https://www.voltdb.com/why-voltdb/, capture Mar. 22, 2018, 2 pages.

Unknown, "Order Management Systems, The Key to Successful Order Management in Digital Commerce", Intershop Communications AG, captured Mar. 22, 2018, 28 pages.

Terence Yim, "High Throughput Stream Processing with ACID Guarantees", InfoQ, https://www.infoq.com/presentations/acid-stream-processing?utm_source=infoq&utm_medium=slideshare&utm_campaign=slidesharesf#, captured Mar. 22, 2018, 2 pages.

Unknown, "GridGain In-Memory Database", GridGain Systems, https://www.gridgain.com/technology/in-memory-computing-platform/database, capture Mar. 22, 2018, 5 pages.

Unknown, "Multichannel Order Management Solution", Unicommerce, https://www.unicommerce.com/multichannel/, captured Mar. 22, 2018, 8 pages.

Young, Lee W., "International Search Report", International Application No. PCT/US2019/023179, dated Jun. 6, 2019, 2 pages.

Young, Lee W., "Written Opinion", International Application No. PCT/US2019/023179, dated Jun. 6, 2019, 5 pages.

* cited by examiner

HIGH THROUGHPUT ORDER FULLFILLMENT DATABASE SYSTEM

BACKGROUND

This disclosure relates to the field of computing systems and, more particularly, to database transactions. Databases are used for a variety of applications. In one example, a database may store order fulfillment records. For example, an order fulfillment database may store orders associated with customer orders, internal transfer orders, supply chain orders, commercial orders, or the like. The order fulfillment database may store customer orders from one or more online websites or e-commerce applications. As orders are processed, the order fulfillment database may be updated to reflect the change in statuses for the orders. Furthermore, the order fulfillment database may expose data to a variety of internal and external applications. The heavy utilization of the order fulfillment database may be more than can be handled by a simple database system. Furthermore, it is desirable to provide an order fulfillment database with high reliability and high throughput so that the order fulfillment database can concurrently support multiple order fulfillment entities.

SUMMARY

This Summary is provided to introduce a selection of concepts (in a simplified form) that is further described below in the Detailed Description. This Summary is not intended to identify key features or essential features of the claimed subject matter, nor is it intended to be used as an aid in determining the scope of the claimed subject matter.

This disclosure provides an order fulfillment database system. Order services instances may provide in-memory databases that service segments of a persistent database and which are associated with different order fulfillment entities. A routing manager may route database messages to the appropriate order services instance. A secondary cluster of order services instances may provide redundancy. A messaging manager may manage asynchronous database messages as a chain of transactions routed through the routing manager. A retry procedure may preserve the integrity of the database transactions based on a current operational state of the primary order services instances and the completion status of the chain of transactions.

One innovative aspect of the subject matter described in this disclosure can be implemented as an order fulfillment database system. The system may include at least one persistent database configured to maintain order fulfillment records for a plurality of order fulfillment entities. The system may include a first plurality of order services instances. Each order services instance of the first plurality of order services instances may be associated with a different subset of the plurality of order fulfillment entities. Each order services instance may include an in-memory database for storing a respective subset of the order fulfillment records related to a respective subset of the plurality of order fulfillment entities. The system may include a routing manager configured to maintain a routing map indicating which order services instance is associated with which order fulfillment entities. The routing manager may be configured to route a database message for a particular order fulfillment entity to a corresponding order services instance.

In some implementations, the system may include a queue system configured to queue asynchronous database messages. The system may include a messaging manager configured to manage execution of asynchronous database messages via the routing manager.

In some implementations, the messaging manager may manage execution of an asynchronous database message as a synchronous database message via the routing manager without establishing an asynchronous database connection to the at least one persistent database.

In some implementations, the messaging manager may facilitate atomicity, consistency, isolation, and durability (ACID) transactions by managing execution and retry procedures.

In some implementations, the system may include a second plurality of order services instances as a redundancy to the first plurality of order services instances. Each order services instance of the second plurality of order services instances may be associated with the different subset of the plurality of order fulfillment entities.

In some implementations, the second plurality of order services instances may be hosted at a disaster recovery location that is different from a primary location that hosts the first plurality of order services instances.

In some implementations, the second plurality of order services instances may not utilize in-memory databases, and instead, utilize database connections to the at least one persistent database.

In some implementations, the first plurality of order services instances may be configured to respond to read requests using the in-memory database without accessing the at least one persistent database.

In some implementations, the routing manager may maintain a current operational state for each order services instance in the first plurality of order services instances.

Another innovative aspect of the subject matter described in this disclosure can be implemented as a method for providing high throughput database services. The method may include maintaining order fulfillment records for a plurality of order fulfillment entities in at least one persistent database. The method may include establishing a plurality of order services instances. Each order services instance may be associated with a different subset of the plurality of order fulfillment entities. Each order services instance may include an in-memory database for storing a respective subset of the order fulfillment records related to a respective subset of the plurality of order fulfillment entities. The method may include maintaining, by a routing manager, a routing map indicating which order services instance is associated with which order fulfillment entities. The method may include routing, by the routing manager, a database message for a particular order fulfillment entity to a corresponding order services instance.

In some implementations, the method may include receiving, at the routing manager, a first database message for a first order fulfillment entity. The method may include determining that the first order fulfillment entity is in a first subset of the plurality of order fulfillment entities and that the first subset of the plurality of order fulfillment entities is associated with a first order services instance. The method may include routing the first database message to the first order services instance.

In some implementations, the method may include maintaining, by the routing manager, a current operational state for each order services instance in the plurality of order services instances. Routing the first database message to the first order services instance may be in response to a determination that the current operational state of the first order services instance is online.

In some implementations, the method may include determining that the current operational state of the first order services instance is offline, and routing the first database message to a secondary order services instance.

In some implementations, the method may include determining that the current operational state of the first order services instance is initializing, storing the first database message in a back-out to retry later if the first database message includes a write request, and routing the first database message to a secondary order services instance if the first database message is a read request.

In some implementations, the method may include managing, by a messaging manager, an execution of an asynchronous database message via the routing manager.

In some implementations, managing the execution of the asynchronous database message may include storing the asynchronous database message in an input queue, creating a chain of transactions that includes at least a first transaction at the in-memory database and a second transaction at the at least one persistent database, and determining whether the chain of transactions have completed before removing the asynchronous database message from the input queue.

In some implementations, managing the execution of the asynchronous database message further may include, if the second transaction fails, rolling back the first transaction and retry the chain of transactions, if the second transaction completes but the first transaction fails, rolling back the first transaction and retry the chain of transactions excluding the second transaction, and if the first transaction completes and the second transaction completes, completing the chain of transactions and remove the asynchronous database message from the input queue.

In some implementations, managing the execution of the asynchronous database message may include determining that the chain of transactions did not complete after a quantity of retry attempts, and moving the asynchronous database message to a back-out queue.

In some implementations, the method may include responding, by one of the plurality of order services instances, to a read request using the in-memory database without accessing the at least one persistent database.

Details of one or more implementations of the subject matter described in this disclosure are set forth in the accompanying drawings and the description below. Other features, aspects, and advantages will become apparent from the description, the drawings, and the claims.

BRIEF DESCRIPTION OF THE DRAWINGS

The present description will be better understood from the following detailed description read in light of the accompanying drawings.

Corresponding reference characters indicate corresponding parts throughout the drawings. The systems depicted in the figures are illustrated as schematic drawings. Note that the relative dimensions of the figures may not be drawn to scale.

DETAILED DESCRIPTION

Figure 1:
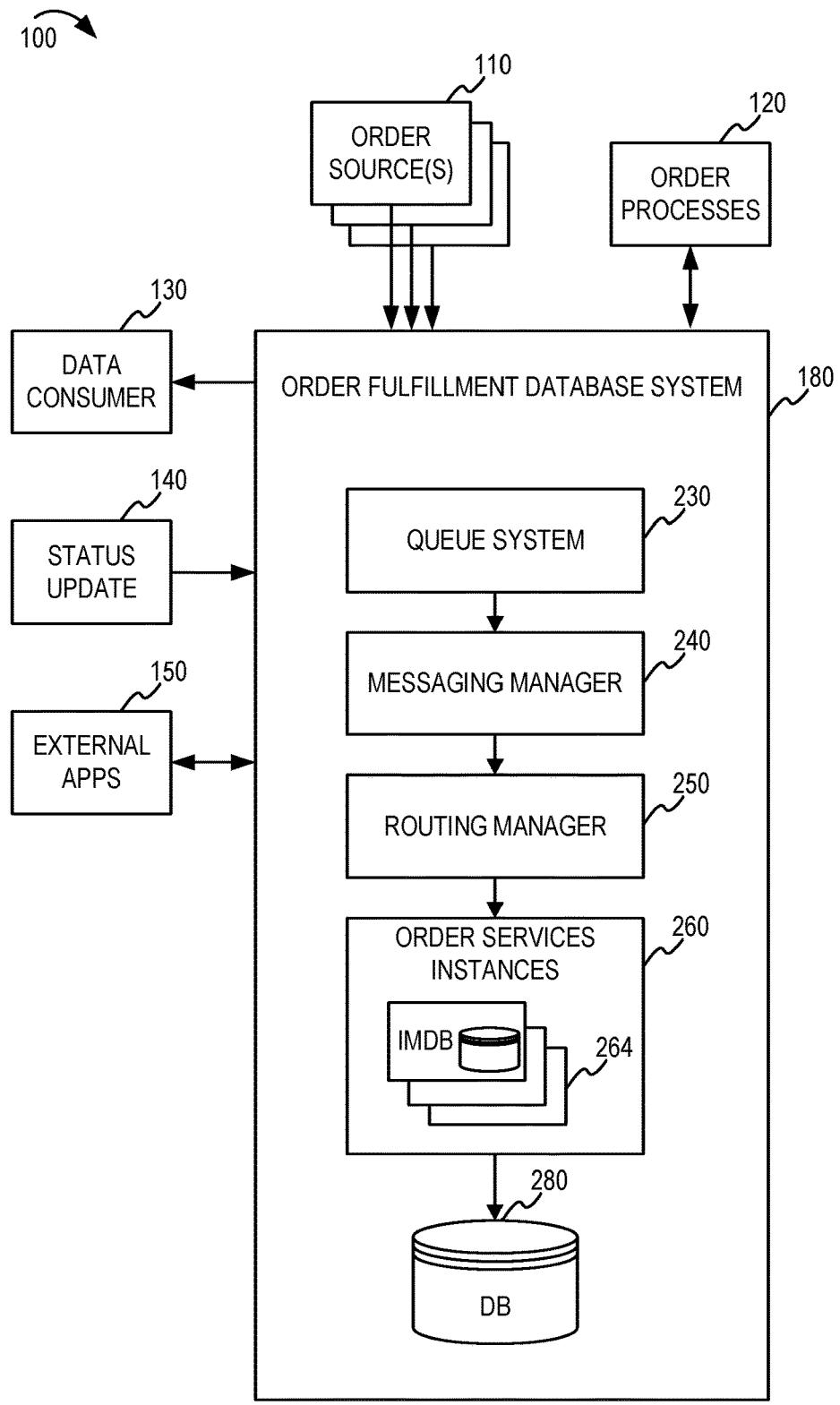
FIG. 1 depicts an example system diagram of an order fulfillment database system.

The systems and methods described herein are related to an order fulfillment database system. However, the techniques may be used for other types of database systems which would benefit from high throughput, availability, and resiliency. One of the goals of the disclosed database technology is to support ACID transactions (Atomicity, Consistency, Isolation, Durability) with dependable transaction processes under high volume. The disclosed system supports guaranteed ACID transactions, high availability (over 99.99% uptime), high scalability, fast transaction processing (such as less than 100 milliseconds for nearly all database requests), high throughput (over 10000 transactions per second), and retry capability to handle errors, as well as disaster recovery capabilities.

Traditional database systems may have limited throughput or performance based on design or hardware limitations. For example, deploying multiple front-end application servers with a centralized database may create a bottleneck at the centralized database that may not scale for higher throughput. Alternatively, the use of a distributed database (partition) may provide scalability but may create problems with consistency due to data replication in the distributed database architecture. There is a theoretical limitation in computer science called the CAP theorem (referring to Consistency, Availability, and Partition tolerance) that posits it is not possible for a distributed data store to simultaneously provide more than two out of the three CAP guarantees. In other words, the CAP theorem states that in the presence of a network partition, one has to choose between consistency and availability. The present disclosure aims to overcome the limitations of the CAP theorem through innovative use of request routing, fault tolerance using request retry or redirection, and guaranteed ACID transactions.

The example database system in this disclosure is an order fulfillment database system. The order fulfillment database system may be used to store and maintain status regarding fulfillment orders. For example, when a customer order is placed on a website, retail market, or another order source, a fulfillment order may be generated and stored in the order fulfillment database system. In some scenarios, the order fulfillment database system may store order fulfillment records from many different sources, such as a multi-channel commercial enterprise. The fulfillment order may go through a series of steps before the customer order is completed. The transition of a fulfillment order from one status to another status may be maintained by an order services application that is part of the order fulfillment database system. The order services application may enable the updating of order status by different order fulfillment entities or applications. The order services application may track updates and schedules associated with a fulfillment order.

In accordance with this disclosure, an order fulfillment database system may maintain order fulfillment records. The order fulfillment database system may use a hybrid approach that combines a persistent database with in-memory databases and order services instances. Each order services instance may be associated with different stores (retail locations) or sales channels. An order services instance may use an in-memory database for fast transaction times and high throughput. Read requests may be answered by the order services instance without impacting utilization of the persistent database. Because the order services instances are partitioned with in-memory databases having a subset of the order fulfillment records, additional order services instances may be added to quickly scale the order services application for many order fulfillment entities. Data replication at the order services instances is avoided while the order fulfillment records are partitioned among multiple in-memory databases. Thus, the order services instances provide high scalability compared to a traditional distributed database system. Write requests which cause an update to the order status may be processed as a chain of transactions that updates the in-memory database as well as the persistent database. A retry and redirection technique maintains the ACID guarantee for the write requests.

In one aspect of this disclosure, a routing manager may maintain a mapping of which order services instances are responsible for different order fulfillment entities. As an example, an enterprise that has multiple retail locations or distribution centers may partition the order fulfillment records into different order services instances associated with groups of retail locations (or distribution centers). The routing manager may monitor a current operational state associated with each order services instance and route database requests according to the current operational state.

In another aspect of this disclosure, a messaging manager and queue system may be used to manage database requests. The messaging manager may send database requests via the routing manager while maintaining an execution status of a chain of transactions. The messaging manager may manage the retry mechanism to ensure consistency and atomicity of database transactions in the hybrid architecture. In some implementations, the ACID transactions are performed without using distributed transactions. Distributed transactions are database transactions that must be coordinated and span multiple databases or systems. Distributed transactions may negatively impact response times or create transaction congestion. By using the message manager and retry techniques in this disclosure, distributed transactions can be avoided.

In another aspect of this disclosure, the order fulfillment database system may be extended to include disaster recovery and fault tolerance. For example, redundant systems and message handling may provide acceptable performance even with some hardware failures. For example, the order fulfillment database system may effectively handle some hardware failures like host machine reboot, replacement, and the like while continuing to support order services applications.

Particular implementations of the subject matter described in this disclosure can be implemented to realize one or more of the following potential advantages. An order fulfillment database system can support high throughput and high availability for ACID transactions. Using order services instances with portioned data, the order fulfillment database system may leverage the scalability advantages of a distributed database architecture without the disadvantages of data replication. Combining in-memory databases with a persistent database provides the advantages that come with both database architectures. The messaging manager and routing manager may enable the hybrid database architecture to provide high throughput.

FIG. 1 depicts an example system diagram of an order fulfillment database system. The system diagram 100 shows an order fulfillment database system 180. The order fulfillment database system 180 may receive orders from a variety of order sources 110. Examples of order sources may include e-commerce websites, client applications, electronic kiosks, phone call centers, application programming interface (APIs) with third parties, or the like. The order sources 110 may be associated with customer orders, intra-enterprise orders, external supply chain orders, or the like. Each order may be associated with a fulfillment order that is stored as a record in the database 280 of the order fulfillment database system 180. As the fulfillment order is processed, there may be different order processes 120 that impact the status of the fulfillment order. For example, the order processes 120 may include "picking" (obtaining the ordered items from a warehouse or distribution center), scheduling transportation, or the like. The order processes 120 may obtain the status of a fulfillment order, may provide a status update, or both. Some order processes 120 may be performed by external third parties.

As shown in FIG. 1, there may be a variety of internal and external entities which make use of the order fulfillment database system 180. For example, a data consumer 130 may include a management application, a customer portal, a reporting tool, or another administrative consumer of order status information regarding the fulfillment orders. Some entities may provide order status updates 140. For example, a warehouse employee, retail associate, distribution center machine, or other entities may send updates regarding a fulfillment order to the order fulfillment database system 180. There may be external applications 150 which may access or update order status information. In a multi-channel enterprise, the external applications may be associated with APIs or other interfaces to different channels or entities. Furthermore, the order fulfillment steps may include multiple status updates for each fulfillment order. For example, order fulfillment activities may be performed sequentially based on dependencies. As one example, the tax for a customer order may be calculated only after the picking (including nil picks) of items ordered is finished.

Due to the high quantity of potential users of the order fulfillment database system 180, the order fulfillment database system 180 must provide high throughput and scalability. Rather than having each entity access the database 280 directly, the order fulfillment database system 180 includes a queue system 130, messaging manager 240, routing manager 250, and multiple order services instances 260. These components of the order fulfillment database system 180 are described in more detail in FIG. 2. Each order services instance may host an in-memory database 264 (also referred to as IMDB or main memory database). An in-memory database is a database management system that primarily relies on main memory for computer data storage, rather than a disk storage mechanism commonly associated with a persistent database. In-memory databases may be faster than disk-optimized databases because disk access is slower than memory access, the internal optimization algorithms may be simpler and execute fewer CPU instructions. Meanwhile, the disk-optimized database (such as persistent database 280) may provide persistent storage of order status even when an in-memory database fails or becomes temporarily unavailable.

Figure 2:
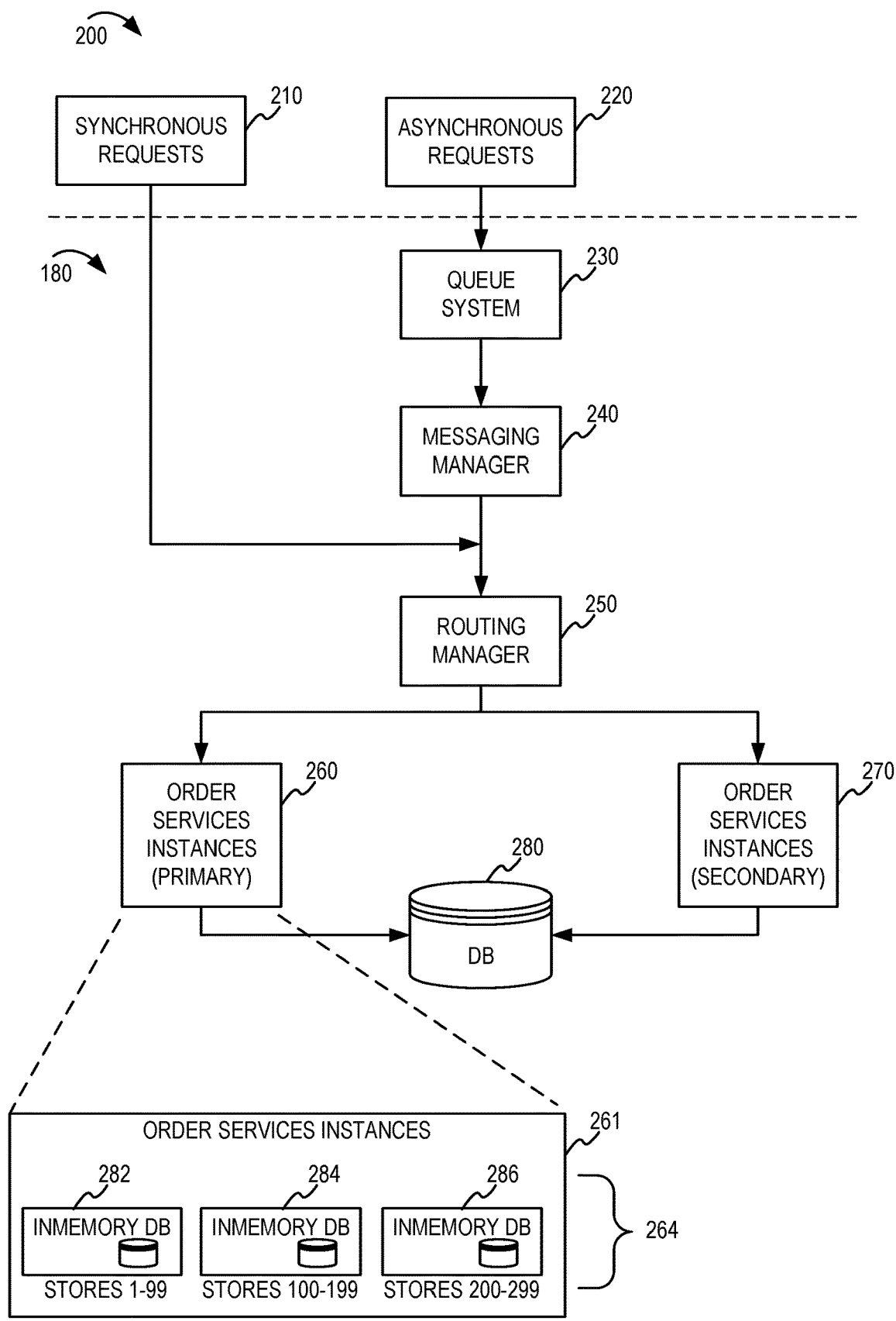
FIG. 2 depicts an example system diagram for describing example operations of the order fulfillment database system.

FIG. 2 depicts an example system diagram for describing example operations of the order fulfillment database system. The order fulfillment database system 180 is shown in the bottom portion of the Figure. A top portion 200 shows the different types of database requests (which also may be referred to as database transactions or calls) which the order fulfillment database system 180 may process, including synchronous requests 210 and asynchronous requests 220. The synchronous requests 210 and asynchronous requests 220 may come from any of the entities described in relation to FIG. 1. Synchronous requests 210 may be atomic transactions that are fully executed at the time they are processed. Asynchronous requests 220 may include requests that include write/update instructions that modify the database. The processing of synchronous requests 210 and asynchronous requests 220 may traditionally be handled differently by a database system. In this disclosure, the asynchronous requests 220 may be managed by the queue system 230 and the messaging manager 240, effectively converting an asynchronous request to a synchronous request. An asynchronous request may enter the queue system 230 for processing. The messaging manager 240 may generate a chain of transactions that includes updates to both the second order services instance 284 and the database 280. The chain of transactions is managed so that each transaction can be monitored for completion or failure. The messaging manager 240 may implement a retry mechanism, which is further described in FIG. 6, to ensure that each asynchronous request is properly processed in the order fulfillment database system 180.

The routing manager 250 maintains a mapping of which order fulfillment entities are associated with which order services instance. When the synchronous requests 210 or messages from the messaging manager 240 are received by the routing manager 250, the routing manager 250 may route the database transaction to the appropriate order services instance. A primary cluster 260 may include multiple order services instances 264 (as shown in blowup 261). For example, a first order services instance 282 may have an in-memory database storing the fulfillment order records for a first subset of retail locations (such as stores 1-99). A second order services instance 284 may have an in-memory database storing the fulfillment order records for a second subset of retail locations (such as stores 100-199). A third order services instance 286 may have an in-memory database storing the fulfillment order records for a third subset of retail locations (such as stores 200-299), and so on. The partition of order fulfillment records may be based on retail locations (as shown in FIG. 2) or by any other logical segmentation/partition that can be defined. The routing manager 250 may store the current operational state for each order services instance as well as indications of which subsets of retail locations are services by each order services instance.

A secondary cluster 270 may provide a disaster recovery (also referred to as failover, backup, or redundancy) capability. In some implementations, the secondary cluster 270 may include similarly segmented order services instances corresponding to the primary cluster 260. The order services instances in the secondary cluster 270 may not use in-memory databases, but rather may provide direct access to the database 280. This is to avoid the drawbacks associated with data replication that would be needed to reconcile differences between the secondary cluster 270 and the primary cluster 260. The secondary cluster 270 may provide degraded service while still maintaining operational capability of the order fulfillment database system 180 until a failed order services instance in the primary cluster 260 can be restarted. In addition to disaster recovery, the order fulfillment database system 180 may use cluster systems to provide additional fault tolerance, as shown in FIG. 3.

Figure 3:
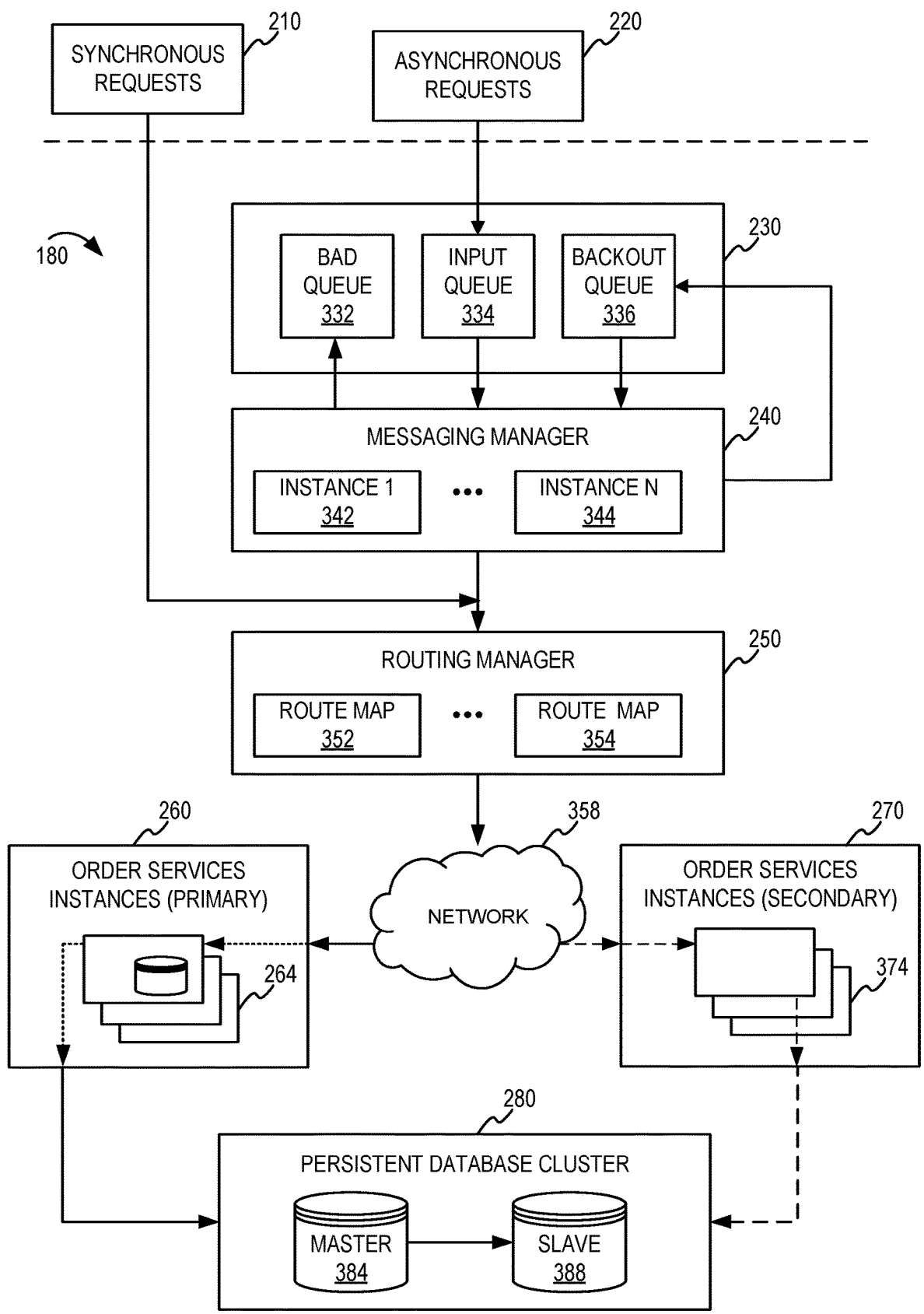
FIG. 3 depicts an example system diagram for describing for redundancy and resiliency features of an example order fulfillment database system.

FIG. 3 depicts an example system diagram for describing for redundancy and resiliency features of an example order fulfillment database system. The order fulfillment database system 180 includes the queue system 230, the messaging manager 240, the routing manager 250, the primary cluster 260, the secondary cluster 270, and the database 280 as described above. The database 280 may be a persistent database cluster that includes a master database 384 and a slave database 388. In some implementations, the slave database 388 may be stored in a separate facility as the master database 384. Likewise, the primary cluster 260 and the secondary cluster 270 may be hosted at different locations. A network 358 may communicatively couple the primary cluster 260, the secondary cluster 270, the routing manager 250, and other components of the order fulfillment database system 180. As described above, the primary cluster 260 includes multiple order services instances 264 with in-memory databases. The routing manager 250 maintains a mapping of order service instances to order fulfillment entities. The routing manager 250 may include multiple instances of a route map, such as route map 352 and route map 354. When the routing manager 250 receives a request (either a synchronous request or a message from the messaging manager 240), one of the route maps 352 may handle the request and forward it to the appropriate order services instance. Thus, the route maps may provide fault tolerance and scalability of the routing manager 250. If a primary order services instance is down, the routing manager 250 may route the request to a corresponding secondary order services instance 374 in the secondary cluster 270.

The operation of the messaging manager 240 and the queue system 230 may manage the processing of asynchronous requests 220. An asynchronous request may be received in an input queue 334 of the queue system 230. The messaging manager 240 may include multiple instances for fault tolerance and scalability. For example, messaging manager instance 1 342 and messaging manager instance N 344 may each independently be capable of managing the execution of the asynchronous transaction. One of the messaging manager instances of the messaging manager 240 may obtain the asynchronous request from the input queue 334 and create a chain of transactions. For example, the chain of transactions may include a An asynchronous request message comes to the input queue and a chain of a message service wrapper (such as a Java™ Message Service), an in-memory database transaction, and a persistent relational database (DB) transaction. Below is a representation of an example chain of transactions:

```
JMS Tx Begin {
    InMemoryDB Tx Begin {
        PersistentDB Tx Begin {
            ... ...
            ... ...
        } PersistentDB Tx Commit
    } InMemoryDB Tx Commit
} JMS Tx Commit
```

The chain of transactions includes interleaved transactions. The messaging manager 240 may handle different error scenarios that may occur during the execution of the chain of transactions. For example, if the PersistentDB transaction fails, the changes may be rolled back along with the JMS transaction and the InMemoryDB transaction. The message will continue to exist in the input queue 334 and will be retried in accordance with a retry policy. If the PersistentDB transaction commits but the InMemoryDB transaction fails, the JMS transaction may be rolled back along with the InMemoryDB transaction, but the PersistentDB would remain updated. Based on the retry policy, the message will be retried. The retry will not update the PersistentDB again as the prerequisite entity state required for the update would not exist anymore but the InMemoryDB will be updated. In another example error scenario, if the PersistentDB transaction commits and the InMemoryDB transaction commits but the JMS transaction fails, the JMS transaction will be rolled back, but both the databases would remain updated. Based on the retry policy, the message will be retried. The retry will not update either of the databases again as the prerequisite entity state required for the update wouldn't exist anymore. The database transactions will complete gracefully without any side effect.

If the JMS transaction completes successfully (including the interleaved transactions), the message would be taken off the input queue 334. Otherwise, the message may be moved to the back-out queue 230. The number of retries depends on the retry policy beyond which the message will be moved to the backout queue 336. The back-out queue 336 may have its own retry policy. A bad queue 332 may store bad requests that cannot be processed.

In some implementations, the queue system 230 may not execute Java™ Database Connectivity (JDBC) APIs. The JDBC APIS may traditionally be used for asynchronous update requests to the database 280. However, the JDBC APIs may limit the effective throughput and capacity of the order fulfillment database system. Therefore, the use of the messaging manager 240 and the queue system 230 provides the message handling and execution status while presenting a chain of transactions via the routing manager 250 for high throughput processing.

Figure 4:
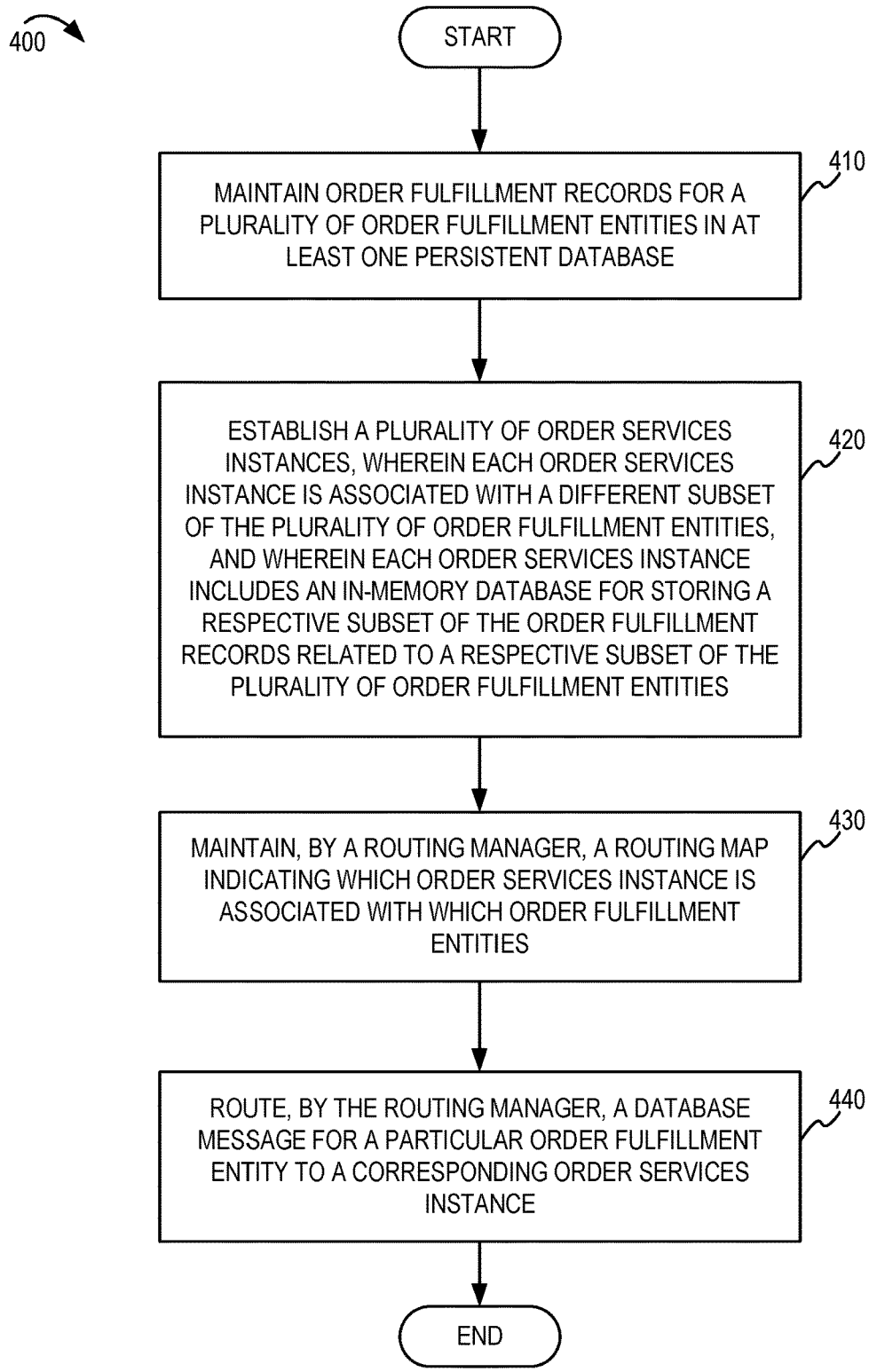
FIG. 4 depicts an example flowchart for an order fulfillment database system.

FIG. 4 depicts an example flowchart for an order fulfillment database system. The flowchart 400 begins at block 410. At block 410, the order fulfillment database system may maintain order fulfillment records for a plurality of order fulfillment entities in at least one persistent database. At block 420, the order fulfillment database system may establish a plurality of order services instances. Each order services instance may be associated with a different subset of the plurality of order fulfillment entities. For example, each order service instance may be associated with a group of retail stores or distribution centers. Each order services instance may operate an in-memory database for storing a respective subset of the order fulfillment records related to a respective subset of the plurality of order fulfillment entities.

At block 430, the order fulfillment database system may maintain, by a routing manager, a routing map indicating which order services instance is associated with which order fulfillment entities. The routing manager also may maintain a current operational state for each order services instance. The routing manager may be capable of redirecting database requests or transactions to a secondary order services instance at a disaster recovery cluster of backup order services instances.

At block 440, the order fulfillment database system may route, by the routing manager, a database message for a particular order fulfillment entity to a corresponding order services instance. A messaging manager may maintain an execution status for a chain of transactions associated with an asynchronous request and perform roll back and/or retry procedures in accordance with a retry policy.

Figure 5:
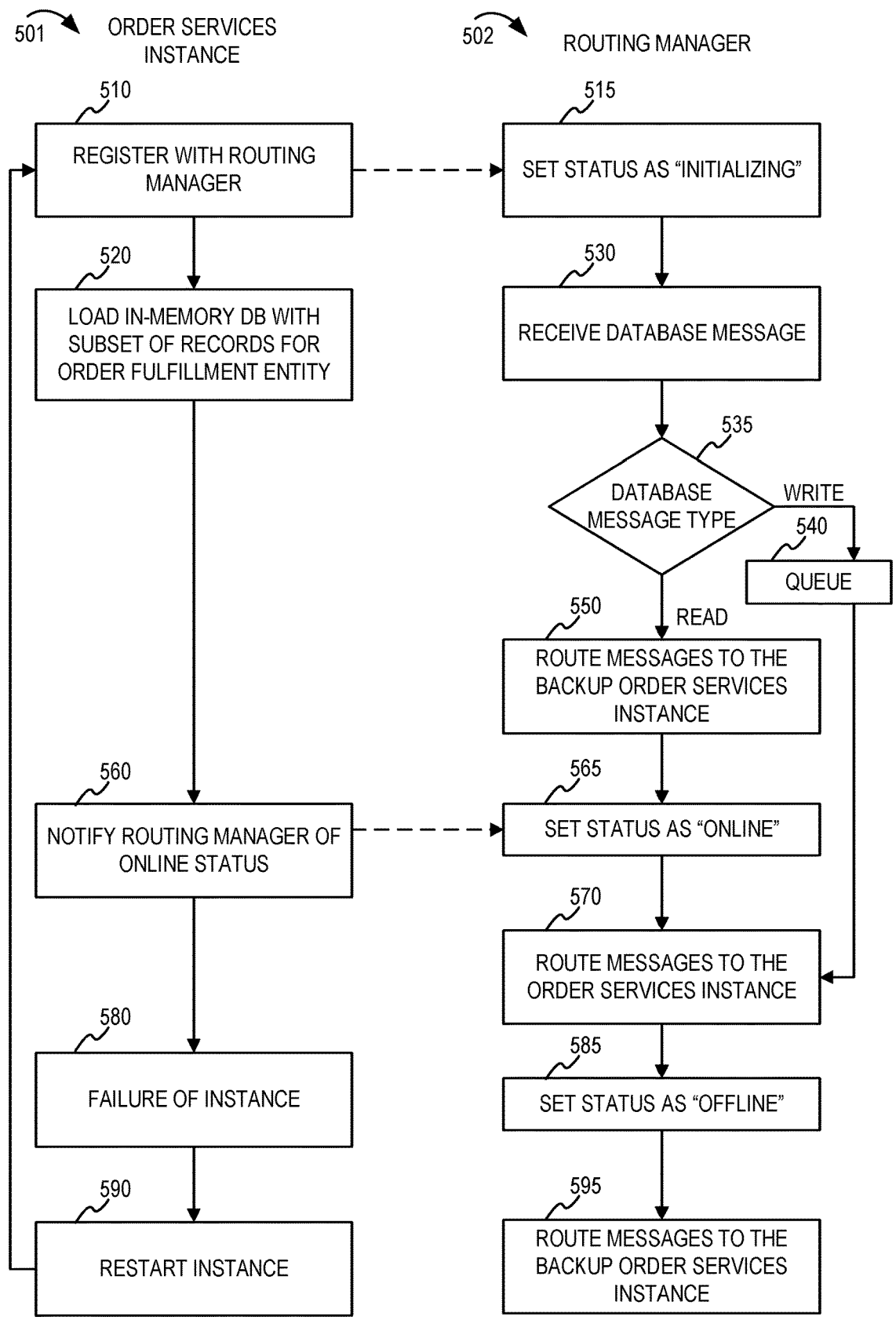
FIG. 5 depicts an example flowchart showing example operations which may be performed by an order services instance and a routing manager of an order fulfillment database system.

FIG. 5 depicts an example flowchart showing example operations which may be performed by an order services instance and a routing manager of an order fulfillment database system. In FIG. 5, a first flowchart 501 shows example operations that may be performed by each order services instance. A second flowchart 502 is shown next to the first flowchart 501. The second flowchart 502 shows example operations that may be performed by a routing manager.

The first flowchart 501 begins at block 510. At block 510, the order services instance may startup. The order services instance may register with the routing manager. For example, the order services instance may inform the routing manager that it is starting up. The order services instance also may inform the routing manager which order fulfillment entities (such as stores) it will handle when it has finished starting up. The current operational state of the order services instance may be referred to as "initializing." During the initializing state, at block 520, the order services instance may load an in-memory database with a subset of records from the persistent database. The subset of records is associated to a portioned subset of the order fulfillment entities (such as retail stores). At block 560, the order services instance may notify the routing manager that it has completed the startup process and has a current operational state of "online." Thereafter, the order services instance may be available to process database requests associated with the subset of order fulfillment entities it has loaded from the persistent database.

A failure of the order services instance may occur, such as block 580. There may be a variety of ways to detect a failure of the order services instance. For example, a network operations center may manage availability for the hardware and service associated with the order services instance. The routing manager may detect the failure. In some implementations, the order services instance itself may have a routine to monitor its health and detect the failure. At block 590, the order services instance may restart, returning to block 510. The order services instance may restart on its own or may be restarted by a network management utility.

The second flowchart 502 shows example operations of the routing manager in coordination with the described example operations of the order services instance. Furthermore, the second flowchart 502 indicates how some database messages may be processed based on the current operational state of the order services instance. The second flowchart 502 begins at block 515 in response to the order services instance registering with the routing manager. At block 515, the routing manager may store parameters associated with the order services instance, including the current operational state of "initializing."

At block 530, the routing manager may receive a database message while the order services instance is initializing. At decision 535, the routing manager may determine if the database message type is a read request or a write request. If the database message is a read request, the routing manager may route the message to the secondary (backup) order services instance at block 550. If the database message is a write request, the database message may be stored in a backout queue 540. The write requests will be suspended (in the backup queue) if the primary order services instance is initializing. This is to ensure that the update is properly processed by the primary order services instance after the order services instance has synchronized with the persistent database.

At block 565, in response to a notification from the order services instance, the routing manager may set the current operational state for the order services instance as "online." Thereafter, the routing manager may route messages to the order services instance at block 570, including any transactions that were suspended in the backout queue 540.

Upon detecting a failure of the order services instance, the routing manager may update the current operational state for the order services instance to "offline" at block 585. If the primary order services instance is offline, the routing manager will route messages to the secondary (backup) order services instance at block 595.

Figure 6:
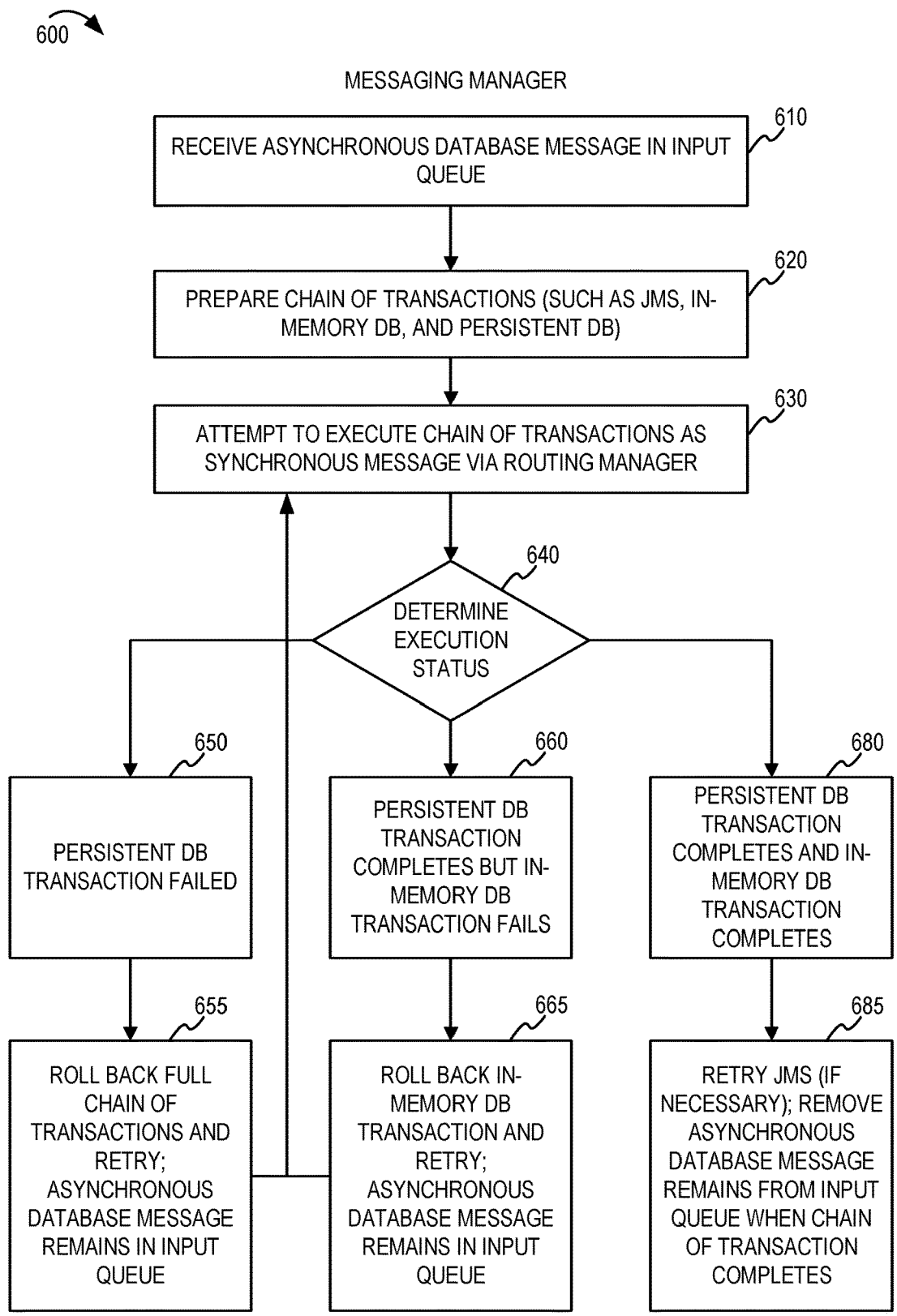
FIG. 6 depicts an example flowchart showing example operations which may be performed by a messaging manager of an order fulfillment database system.

FIG. 6 depicts an example flowchart showing example operations which may be performed by a messaging manager of an order fulfillment database system. The flowchart 600 begins at block 610. At block 610, the messaging manager may receive an asynchronous database message from an input queue. At block 620, the messaging manager may prepare a chain of transactions that includes at least a first transaction at the in-memory database and a second transaction at the at least one persistent database. For example, the chain of transactions may include a JMS transaction, an in-memory database transaction, and a persistent database transaction. At block 630, the messaging manager may attempt to execute the chain of transactions as a synchronous message via the routing manager.

At decision 640, the messaging manager may determine whether the chain of transactions have completed. Depending on the execution status, the flowchart 600 may proceed to blocks 650, 660, or 680.

At block 650, the messaging manager may determine that the second transaction (persistent database transaction) failed. If so, then at block 655, the messaging manager may roll back the first transaction and retry the chain of transactions. The asynchronous database message may remain in the input queue during the retry. The quantity of retry attempts may be set in a retry policy.

Alternatively, at block 660, the messaging manager may determine that the second transaction (persistent database transaction) completes but the first transaction (in-memory transaction) fails. If so, then at block 665, the messaging manager may roll back the first transaction and retry the chain of transactions excluding the second transaction.

Alternatively, at block 680, the messaging manager may determine that both the first transaction and the second transaction completes. If so, at block 685, the message manager may complete the chain of transactions and remove the asynchronous database message from the input queue.

Additional Example Scenarios

Aspects of the disclosure enable various additional scenarios. For example, instead of an order fulfillment database system, the disclosed techniques could be used for other types of database systems requiring high throughput and availability. For example, the disclosed techniques could be used for purchase order systems, invoicing systems, security transactions, blockchain applications, or the like.

Various design alternatives may be possible. For example, the messaging manager and queue system may be implemented externally to the order fulfillment database system. Alternatively, the messaging manager and queue system may be integrated or collocated with other components of the order fulfillment database system. The routing manager may be implemented using different types of route maps. For example, the order services instances may be identified by a network address (such as an internet protocol, IP, address). A routing table may be extended to include information the relates the network address to the subset of order fulfillment entities that are serviced by each order services instance.

Example Operating Environment

Figure 7:
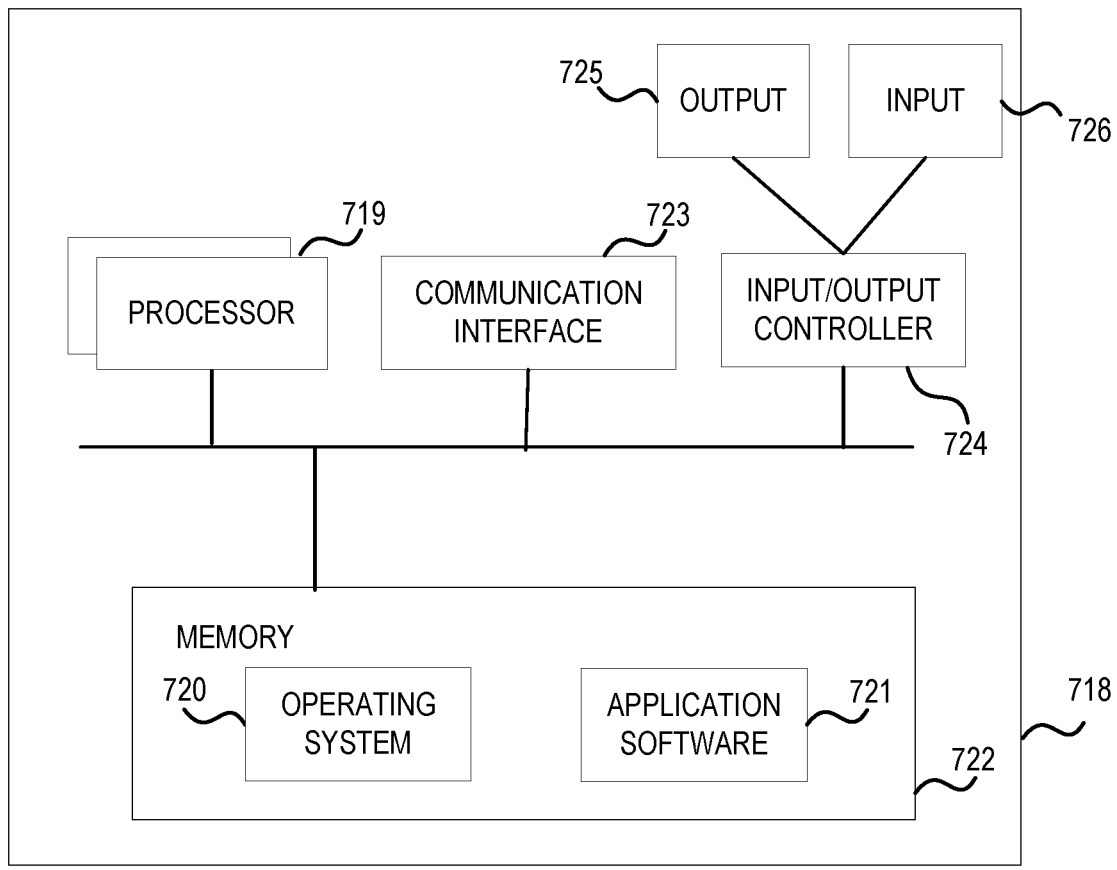
FIG. 7 depicts an example functional block diagram of an operating environment in which some aspects of this disclosure may be implemented.

FIG. 7 depicts an example functional block diagram of an operating environment in which some aspects of this disclosure may be implemented. In an embodiment, components of a computing apparatus 718 may be implemented as a part of an electronic device according to one or more embodiments described in this specification. The computing apparatus 718 comprises one or more processors 719 which may be microprocessors, controllers or any other suitable type of processors for processing computer-executable instructions to control the operation of the electronic device. Platform software comprising an operating system 720 or any other suitable platform software may be provided on the computing apparatus 718 to enable application software 721 to be executed on the device. According to an embodiment, identifying a product, obtaining value per weight data and weight data associated with the product, and generating a digital product label including product ID data and product value data of the product as described herein may be accomplished by software.

Computer-executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable and non-removable media implemented in any method or technology for storage of information such as computer-readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer-readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone or a touchpad. In one embodiment, the output device 725 may also act as the input device. An example of such a device may be a touch-sensitive display. The input/output controller 724 may also output data to devices other than the output device, e.g. a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternative Combinations

While the aspects of the disclosure have been described in terms of various examples with their associated operations, a person skilled in the art would appreciate that a combination of operations from any number of different examples is also within the scope of the aspects of the disclosure. Alternatively, or in addition to the other examples described herein, examples include any combination of the following:

at least one persistent database configured to maintain order fulfillment records for a plurality of order fulfillment entities;

a first plurality of order services instances, wherein each order services instance of the first plurality of order services instances is associated with a different subset of the plurality of order fulfillment entities, and wherein each order services instance includes an in-memory database for storing a respective subset of the order fulfillment records related to a respective subset of the plurality of order fulfillment entities;

a routing manager configured to maintain a routing map indicating which order services instance is associated with which order fulfillment entities, the routing manager configured to route a database message for a particular order fulfillment entity to a corresponding order services instance;

a queue system configured to queue asynchronous database messages;

a messaging manager configured to manage execution of asynchronous database messages via the routing manager;

wherein the messaging manager manages execution of an asynchronous database message as a synchronous database message via the routing manager without establishing an asynchronous database connection to the at least one persistent database;

wherein the messaging manager facilitate atomicity, consistency, isolation, and durability (ACID) transactions by managing execution and retry procedures;

a second plurality of order services instances as a redundancy to the first plurality of order services instances, wherein each order services instance of the second plurality of order services instances is associated with the different subset of the plurality of order fulfillment entities;

wherein the second plurality of order services instances is hosted at a disaster recovery location that is different from a primary location that hosts the first plurality of order services instances;

wherein the second plurality of order services instances do not utilize in-memory databases, and instead utilize database connections to the at least one persistent database;

wherein the first plurality of order services instances are configured to respond to read requests using the in-memory database without accessing the at least one persistent database;

wherein the routing manager maintains a current operational state for each order services instance in the first plurality of order services instances;

maintaining order fulfillment records for a plurality of order fulfillment entities in at least one persistent database;

establishing a plurality of order services instances, wherein each order services instance is associated with a different subset of the plurality of order fulfillment entities, and wherein each order services instance includes an in-memory database for storing a respective subset of the order fulfillment records related to a respective subset of the plurality of order fulfillment entities;

maintaining, by a routing manager, a routing map indicating which order services instance is associated with which order fulfillment entities;

routing, by the routing manager, a database message for a particular order fulfillment entity to a corresponding order services instance;

receiving, at the routing manager, a first database message for a first order fulfillment entity;

determining that the first order fulfillment entity is in a first subset of the plurality of order fulfillment entities and that the first subset of the plurality of order fulfillment entities is associated with a first order services instance;

routing the first database message to the first order services instance;

maintaining, by the routing manager, a current operational state for each order services instance in the plurality of order services instances;

wherein routing the first database message to the first order services instance is in response to a determination that the current operational state of the first order services instance is online;

determining that the current operational state of the first order services instance is offline;

routing the first database message to a secondary order services instance;

determining that the current operational state of the first order services instance is initializing;

storing the first database message in a back-out to retry later if the first database message includes a write request;

routing the first database message to a secondary order services instance if the first database message is a read request;

managing, by a messaging manager, an execution of an asynchronous database message via the routing manager;

storing the asynchronous database message in an input queue;

creating a chain of transactions that includes at least a first transaction at the in-memory database and a second transaction at the at least one persistent database;

determining whether the chain of transactions have completed before removing the the asynchronous database message from the input queue;

if the second transaction fails, roll back the first transaction and retry the chain of transactions;

if the second transaction completes but the first transaction fails, roll back the first transaction and retry the chain of transactions excluding the second transaction;

if the first transaction completes and the second transaction completes, complete the chain of transactions and remove the asynchronous database message from the input queue;

determining that the chain of transactions did not complete after a quantity of retry attempts;

moving the asynchronous database message to a back-out queue;

responding, by one of the plurality of order services instances, to a read request using the in-memory database without accessing the at least one persistent database;

a master persistent database configured to maintain order fulfillment records for a plurality of order fulfillment entities;

a slave persistent database configured as a redundancy to the master persistent database;

a first plurality of order services instances, wherein each order services instance of the first plurality of order services instances is associated with a different subset of the plurality of order fulfillment entities, and wherein each order services instance includes an in-memory database for storing a respective subset of the order fulfillment records related to a respective subset of the plurality of order fulfillment entities;

a second plurality of order services instances as a redundancy to the first plurality of order services instances, wherein each order services instance of the second plurality of order services instances is associated with the different subset of the plurality of order fulfillment entities, and wherein the second plurality of order services instances is hosted at a disaster recovery location that is different from a primary location that hosts the first plurality of order services instances;

a network connecting a routing manager, the first plurality of order services instances, and the first plurality of order services instances;

the routing manager configured to maintain a routing map indicating which order services instance is associated with which order fulfillment entities, the routing manager configured to route database messages for particular order fulfillment entities to corresponding order services instances via the network;

a queue system configured to queue asynchronous database messages, the queue system including at least an input queue and a back-out queue;

a messaging manager configured to manage execution of asynchronous database messages from the queue system via the routing manager;

maintaining order fulfillment records for a plurality of order fulfillment entities in at least one persistent database;

establishing a plurality of order services instances, wherein each order services instance is associated with a different subset of the plurality of order fulfillment entities, and wherein each order services instance includes an in-memory database for storing a respective subset of the order fulfillment records related to a respective subset of the plurality of order fulfillment entities;

maintaining, by a routing manager, a routing map indicating which order services instance is associated with which order fulfillment entities;

routing, by the routing manager, a database message for a particular order fulfillment entity to a corresponding order services instance;

means for receiving, at the routing manager, a first database message for a first order fulfillment entity;

means for determining that the first order fulfillment entity is in a first subset of the plurality of order fulfillment entities and that the first subset of the plurality of order fulfillment entities is associated with a first order services instance;

means for routing the first database message to the first order services instance;

means for maintaining, by the routing manager, a current operational state for each order services instance in the plurality of order services instances;

means for determining that the current operational state of the first order services instance is offline;

means for routing the first database message to a secondary order services instance;

means for determining that the current operational state of the first order services instance is initializing;

means for storing the first database message in a back-out to retry later if the first database message includes a write request;

means for routing the first database message to a secondary order services instance if the first database message is a read request;

means for managing, by a messaging manager, an execution of an asynchronous database message via the routing manager;

means for storing the asynchronous database message in an input queue;

means for creating a chain of transactions that includes at least a first transaction at the in-memory database and a second transaction at the at least one persistent database; and means for determining whether the chain of transactions have completed before removing the the asynchronous database message from the input queue.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer-readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for providing high throughput database services, the system comprising:
    at least one persistent database configured to maintain order fulfillment records for a plurality of order fulfillment entities;
    a first plurality of order services instances comprising:
        a first order services instance that provides ordering services of a first individual retail store and includes a first in-memory database storing a first subset of the order fulfillment records for a first subset of the plurality of order fulfillment entities, and
        a second order services instance that provides ordering services of a second individual retail store and includes a second in-memory database storing a second subset of the order fulfillment records for a second subset of the plurality of order fulfillment entities;
    a plurality of partitions, wherein one partition of the plurality of partitions is between the first order services instance and the second order services instance; and
    a routing manager, operational on at least one processor, which:
        maintains a routing map indicating which order services instance is associated with which order fulfillment entities,
        responsive to determining a current operational state for one order services instance in the first plurality of order services instances being online, routes a database message for a particular order fulfillment entity in the maintained routing map to the one order services instance, and
        responsive to determining the current operational state for the one order services instance in the first plurality of order services instances being offline, routes the database message for the particular order fulfillment entity in the maintained routing map to the second order services instance.

2. The system of claim 1, further comprising:
    a queue system that queues asynchronous database messages; and
    a messaging manager that manages execution of asynchronous database messages via the routing manager.

3. The system of claim 2, wherein the messaging manager manages execution of an asynchronous database message as a synchronous database message via the routing manager without establishing an asynchronous database connection to the at least one persistent database.

4. The system of claim 2, wherein the messaging manager facilitates atomicity, consistency, isolation, and durability (ACID) transactions by managing execution and retry procedures.

5. The system of claim 1, further comprising a second plurality of order services instances that is a redundancy to the first plurality of order services instances.

6. The system of claim 5, wherein the second plurality of order services instances is hosted at a disaster recovery location that is different from a primary location that hosts the first plurality of order services instances.

7. The system of claim 5, wherein the second plurality of order services instances implement database connections to the at least one persistent database.

8. The system of claim 1, wherein the first plurality of order services instances respond to read requests using one or more of the first in-memory database and the second in-memory database without accessing the at least one persistent database.

9. The system of claim 1, wherein:
the routing manager determines the current operational state for each order services instance in the first plurality of order services instances, and
responsive to the current operational state for one order services instance in the first plurality of order services instances being initializing, the one order services instance loads the in-memory database with a subset of records from the persistent database.

10. A method for providing high throughput database services, the method comprising:
maintaining order fulfillment records for a plurality of order fulfillment entities in at least one persistent database;
establishing a plurality of order services instances comprising:
a first order services instance that provides ordering services of a first individual retail store and includes a first in-memory database storing a first subset of the order fulfillment records for a first subset of the plurality of order fulfillment entities, and
a second order services instance that provides ordering services of a second individual retail store and includes a second in-memory database storing a second subset of the order fulfillment records for a second subset of the plurality of order fulfillment entities;
establishing a plurality of partitions, wherein one partition of the plurality of partitions is between the first order services instance and the second order services instance;
maintaining, by a routing manager, a routing map indicating which order services instance is associated with which order fulfillment entities;
responsive to determining a current operational state for one order services instance in the plurality of order services instances being online, routing, by the routing manager, a database message for a particular order fulfillment entity in the maintained routing map to the one order services instance; and
responsive to determining the current operational state for the one order services instance in the first plurality of order services instances being offline, routing, by the routing manager, the database message for the particular order fulfillment entity in the maintained routing map to the second order services instance.

11. The method of claim 10, further comprising:
receiving, at the routing manager, a first database message for a first order fulfillment entity;
determining that the first order fulfillment entity is in the first subset of the plurality of order fulfillment entities and that the first subset of the plurality of order fulfillment entities is associated with the first order services instance; and
routing the first database message to the first order services instance.

12. The method of claim 11, further comprising:
maintaining, by the routing manager, a current operational state for each order services instance in the plurality of order services instances, and
wherein routing the first database message to the first order services instance is in response to a determination that the current operational state of the first order services instance is online.

13. The method of claim 12, further comprising:
determining that the current operational state of the first order services instance is initializing;
storing the first database message in a back-out to retry later if the first database message includes a write request; and
routing the first database message to a secondary order services instance if the first database message is a read request.

14. The method of claim 10, further comprising:
managing, by a messaging manager, an execution of an asynchronous database message via the routing manager, wherein managing the execution of the asynchronous database message includes:
storing the asynchronous database message in an input queue;
creating a chain of transactions that includes at least a first transaction at one or more of the first in-memory database and the second in-memory database and a second transaction at the at least one persistent database; and
determining whether the chain of transactions have completed before removing the asynchronous database message from the input queue.

15. The method of claim 14, wherein managing the execution of the asynchronous database message further includes:
based on the first transaction completing and the second transaction failing, rolling back the first transaction and retrying the first transaction at the in-memory database and second transaction at the at least one persistent database;
based on the second transaction completing but the first transaction failing, rolling back the first transaction and retry the chain of transactions excluding the second transaction; and
based on the first transaction completing and the second transaction completes completing, completing the chain of transactions and remove the asynchronous database message from the input queue.

16. The method of claim 15, wherein managing the execution of the asynchronous database message further includes:
determining that the chain of transactions did not complete after a quantity of retry attempts; and
moving the asynchronous database message from the input queue to a back-out queue storing suspended transactions.

17. The method of claim 10, further comprising:
responding, by one of the plurality of order services instances, to a read request using one or more of the first in-memory database and the second in-memory database without accessing the at least one persistent database.

18. A system comprising:
- a master persistent database that maintains order fulfillment records for a plurality of order fulfillment entities;
- a slave persistent database, which is a redundancy to the master persistent database;
- a first plurality of order services instances comprising:
  - a first order services instance that provides ordering services of a first individual retail store and includes a first in-memory database storing a first subset of the order fulfillment records for a first subset of the plurality of order fulfillment entities, and
  - a second order services instance that provides ordering services of a second individual retail store and includes a second in-memory database storing a second subset of the order fulfillment records for a second subset of the plurality of order fulfillment entities,
  - wherein the first individual retail store is at least one of a retail store location and an online retail store;
- a second plurality of order services instances as a redundancy to the first plurality of order services instances, wherein the second plurality of order services instances provides ordering services of a second individual retail store and is associated with a second subset of the plurality of order fulfillment entities, and wherein the second plurality of order services instances is hosted at a disaster recovery location that is different from a primary location that hosts the first plurality of order services instances;
- a plurality of partitions, wherein one partition of the plurality of partitions is between the first plurality of order services instance and the second plurality of order services instance;
- a network connecting a routing manager, the first plurality of order services instances, and the first plurality of order services instances;
- the routing manager that:
  - maintains a routing map indicating which order services instance is associated with which order fulfillment entities, and
  - responsive to determining a current operational state for one order services instance in the first plurality of order services instances being online, routes database messages for particular order fulfillment entities in the maintained routing map to corresponding order services instances via the network;
  - responsive to determining the current operational state for the one order services instance in the first plurality of order services instances being offline, routes the database messages for the particular order fulfillment entities in the maintained routing map to the second order services instance via the network;
- a queue system that queues asynchronous database messages, the queue system including at least an input queue and a back-out queue; and
- a messaging manager that manages execution of asynchronous database messages from the queue system via the routing manager.

19. The system of claim 1, wherein at least one individual retail store is a retail store location.

20. The method of claim 10, wherein the first plurality of order services instances is a primary order services instance and the second plurality of order services instances is a backup order services instance.

* * * * *